United States Patent [19]

Muilwijk

[11] Patent Number: 4,890,302
[45] Date of Patent: Dec. 26, 1989

[54] CIRCUIT FOR EXTRACTING CARRIER SIGNALS

[75] Inventor: Dirk Muilwijk, Huizen, Netherlands
[73] Assignee: U.S. Philips Corp., New York, N.Y.
[21] Appl. No.: 130,361
[22] Filed: Dec. 8, 1987
[30] Foreign Application Priority Data

Dec. 8, 1986 [NL] Netherlands .......................... 8603110

[51] Int. Cl.$^4$ ............................................. H03D 3/06
[52] U.S. Cl. ..................................... 375/80; 329/300; 375/86
[58] Field of Search .................... 375/4, 77, 80, 83, 86, 375/97, 119; 455/202, 265, 208; 329/50, 104, 110, 126

[56] References Cited

U.S. PATENT DOCUMENTS 3,835,404 9/1974 Nakamura et al. .................. 329/104
4,339,725 7/1982 Ichiyoshi .............................. 329/50

*Primary Examiner*—Benedict V. Safourek
*Attorney, Agent, or Firm*—Emmanual J. Lobato

[57] ABSTRACT

In circuits for reproducing carriers for continuous phase modulation having a rational modulation index these signals are multiplied in a multiplier for producing a harmonic, with unique phases occurring due to phase addition irrespective of the information to be conveyed. This harmonic is selected by means of a bandpass filter and supplied to a divider for reproducing the carrier signal. However, as the desired phases only occur at certain instants the effect of jitter in the reproduced carrier signal is undesirably high.

Jitter suppression is considerably improved by supplying to the bandpass filter only the instantaneous values of the virtually desired phases occurring at the specific instants.

8 Claims, 3 Drawing Sheets

CIRCUIT FOR EXTRACTING CARRIER SIGNALS

BACKGROUND OF THE INVENTION

The invention relates to a carrier reproducing circuit for extracting the carrier signal from a pulse-coded continuous phase-modulated carrier signal having a rational modulation index, this circuit comprising a clock pulse regenerator, a multiplier having a multiplication factor $N(N=2, 3, \ldots)$ for generating an $N^{th}$ harmonic from the modulated carrier signal, a first bandpass filter, coupled to the multiplier for isolating the aforesaid $N^{th}$ harmonic and a divider having the dividend N connected to the first bandpass filter.

Such a carrier reproducing circuit for extracting the carrier signal from a pulse-coded continuous phase-modulated carrier signal is known inter alia from the article entitled "Synchronization properties of continuous phase modulation" by J. Aulin and C. E. Sundberg, published in the "Conference Papers" of "Globecom 82, Global Telecommunication Conference, Miami, Nov. 29–Dec. 2, 1982.

Continuous phase modulation is used because the modulated carrier signals have a constant amplitude enabling non-linear amplification, and because they usually have a small bandwidth. This modulation category comprises among others Tamed Frequency Modulation (TFM), Quadrivalent Three-bit Correlated Cosinusoidal Modulation (Q3RC) and Correlative Phase Shift Keying (CORPSK).

It has appeared that a large jitter value commonly occurs in a carrier signal extracted in the way described hereinbefore.

The invention has for its object to strongly reduce in a simple manner the jitter effect occurring when reproducing a carrier signal from a continuous phase-modulated carrier signal.

SUMMARY OF THE INVENTION

The circuit for extracting carrier signals in accordance with the invention is characterized in that between the multiplier and the first bandpass filter a sampling circuit is inserted connected to the clock pulse regenerator for instantaneous sampling of the $N^{th}$ harmonic under the control of a clock pulse signal originating from the clock pulse regenerator at no less than one predetermined sampling point per symbol time T of the data signal, and for conveying these instantaneously sampled signal values to the first bandpass filter only.

It should be noted here that from the U.S. Pat. No. 3,835,404 a carrier reproducing circuit is known comprising a multiplier, a sampling circuit connected thereto for sampling the multiplied carrier signal under the control of a clock pulse and a cascade arrangement composed of a bandpass filter and a divider connected to the sampling circuit. However, a carrier reproducing circuit for PSK signals is discussed wherein the jitter due to phase displacements in the carrier signal occurring at bit transitions is avoided by sampling by clock pulses having a pulse-width which is smaller than the distance between the successive phase displacements in the modulated carrier signal but having as large a finite width as possible.

In contradistinction thereto it is essential when extracting the carrier signal from a continuous phase-modulated carrier signal in accordance with the invention that instantaneous sampling at predetermined sampling points be achieved for obtaining as reliable a reproduced carrier signal as possible.

BRIEF DESCRIPTION OF THE DRAWING

The invention and its advantages will further be explained with reference to the embodiments shown in the drawing, wherein corresponding elements in the Figures are indicated by identical reference numerals and wherein.

DETAILED DESCRIPTION OF THE INVENTION

Figure 1:
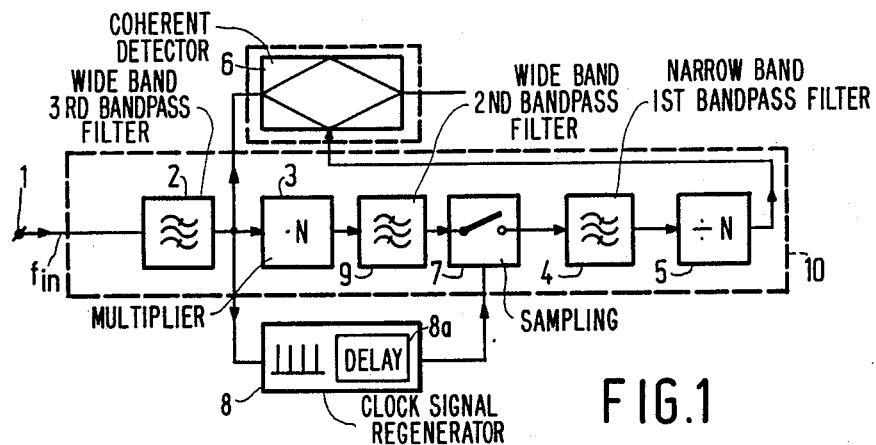
FIG. 1: shows a block diagram of a receiver comprising a carrier reproducing circuit for continuous phase-modulated signals having a rational modulation index in accordance with the invention.

With the receiver comprising a carrier-reproducing circuit 10, shown in FIG. 1, it is possible to extract in a highly reliable way a continuous phase-modulated carrier signal (CPM-signal) applied to input-terminal 1 and having a rational modulation index $\underline{h}$ such that the resulting carrier has a small phase jitter. Before embarking on the explanation of the carrier reproducing circuit, the structure of such a CPM-signal is further elucidated.

An information signal to be transferred digitally, represented by a series $(a_m)$ of m-nary digital symbols, $$(a_m) = \ldots a_{-2}, a_{-1}, a_0, a_1, a_2, \ldots a_n \tag{1}$$

with $a_m = \pm(2n+1)$ and $n = 0, 1, 2, \ldots$ etc.

can be represented as a function of time by $$a(t) = \Sigma a_m p(t - mT) \tag{2}$$

with T representing the duration of the digital symbols and $p(t)$ representing a rectangular pulse of a length of T.

Before transferring such signals they are preferably modulated in that the modulated carrier signal has a constant amplitude. The major advantage of such a carrier signal is the fact that non-linear signal processing such as non-linear amplification for obtaining a high efficiency, can be used without affecting the information contained in the signal.

Each digital modulation having a constant amplitude can be written as:

$$u(t) = \cos(\omega_c t + \phi(t)) \tag{3}$$

wherein $\omega_c$ represents the angular frequency of the carrier signal and $\phi(t)$ represents the phase as a function of time.

If $\phi(t)$ is varied as a function of $a(t)$ the following equation will be obtained:

$$\phi(t) = \phi(a(t)) \tag{4}$$

In Phase Shift Keying (PSK) $\phi(t)$ is kept constant over the symbol time T and changed abruptly at the symbol transitions.

However, there are also types of modulation such as Continuous Phase Frequency Shift Keying (CPFSK), for which the following condition holds:

$$d\ \phi(t)/d(t)=K.a(t) \qquad (5)$$

wherein K is a constant. With Continuous Phase Frequency Shift Keying the detection process for obtaining a better S/N ratio can be spread out over more than one symbol interval.

Examples of CPFSK are Minimum Shift Keying (MSK) and Sinusoidal Frequency Shift Keying (SFSK). MSK is a modulation entailing a linear phase shift of $\pm\pi/2$ per symbol time, which is denoted by the modulation index h=0.5 with h being defined as the number of $\pi$ radians which the phase is changed per symbol time T.

With SFSK not only the phase but also the first derivative of the phase, so the frequency, is continuous. This improves side-band suppression.

If the phase shift with CPFSK is made such that smooth phase transitions between symbol intervals are realized, the phase change will no longer be constant over a symbol interval and one will commonly refer thereto as Continuous Phase Modulation (CPM). In view of the ever occurring phase changes over each symbol time, a special carrier reproducing circuit, for example as shown in FIG. 1, has to be used for extracting the carrier signal from a received CPM-signal.

Examples of CPMs are Raised Cosine Modulation (RCM), having a self-explanatory name and the category of Correlative Phase Modulation (CORPM).

To achieve a further smoothing of the phase shift when using CORPM, the phase change in a symbol time also depends on the information of one or a plurality of preceding symbol times. Known CORPMs are the Tamed Frequency Modulation (TFM), Correlative Phase Shift Keying (CORPSK) and Gaussian Modified Shift Keying (GMSK).

Of all CPM-types only those types are of importance to the invention wherein at fixed points of time substantially fixed phase values occur which can be denoted as a whole fraction of $2\pi$, for example $2\pi/2$ with n=$\pm 1$, $\pm 2$, ...

These types of modulations will further be indicated as CPM with a rational modulation index h. If a carrier signal modulated thus is applied to input terminal 1 of the receiver comprising the carrier-reproducing circuit 10 represented in FIG. 1, the signal is applied to a multiplier 3 in the conventional manner after being filtered in a band-pass filter 2 which will further be referred to as a third bandpass filter. Such a multiplier 3 comprises a non-linear element by means of which the modulated carrier signal, having a factor M and preferably being equal to 2/h, is multiplied for achieving a desired harmonic. As a result of the multiplication the phase variations of the modulated carrier signal end up in the same phase (modulo $2\pi$). In known carrier-reproducing circuits for CPM modulated signals the thus obtained signal is directly applied to a first bandpass filter 4 having a small bandwidth, for example in the order of $1/100^{th}$ $f_{IN}$, where $f_{IN}$ represents the frequency of the received signal, for eliminating all undesired harmonics, after which the desired harmonic of the carrier signal is divided in a divider 5 having dividend N. The thus reproduced carrier signal is applied to a coherent detector 6 likewise connected to the third wide-band filter 2 for coherent demodulation of the filtered input signal.

Figure 2A:
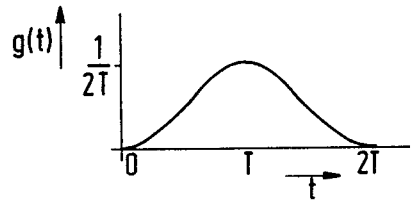
FIG. 2a: shows the impulse response
Figure 2B:
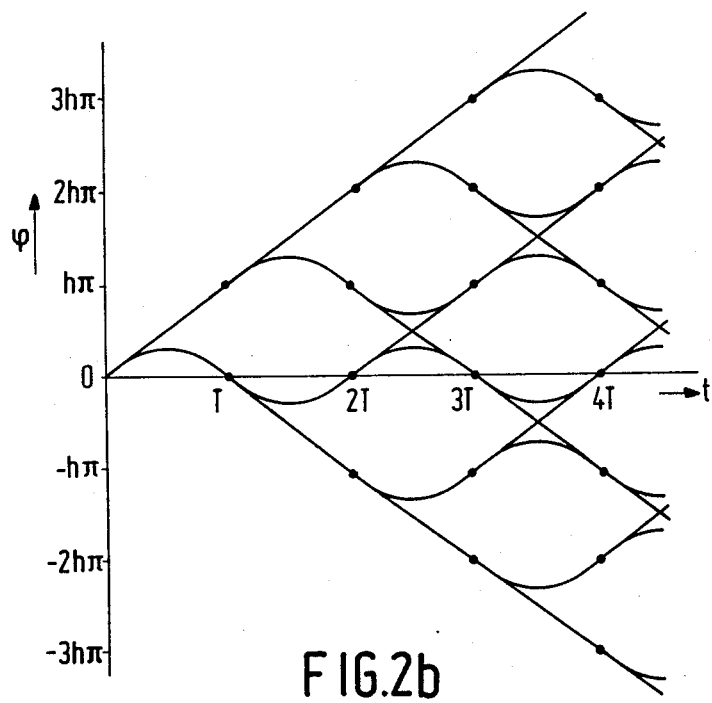
FIG. 2b: shows the waveform of a 2RC-signal.

FIGS. 2a to 4b show several examples of CPM-signals having a substantially rational modulation index. FIG. 2a shows therein the impulse response g(t) of a pulse applied to a modulator (not shown) in a transmitter for RC-signals. The time is plotted along the horizontal axis in units of the symbol time T and the amplitude is plotted along the vertical axis in units of $R^{-1}$. This Figure shows that the impulse response for RC-modulated signals represented therein has a length of 2T and is therefore a CORPM-signal indicated by 2RC. FIG. 2b depicts in a waveform the phase shift of a carrier signal continuously phase-modulated by means of this impulse response. Such a waveform represents any occurring phase variations as a function of time of a carrier signal modulated by an arbitrary data signal. Along the vertical axis is plotted the phase in units of $h\pi$ whereas along the horizontal axis the time is plotted in units of symbol time T.

As is shown in these Figures the phase at the instants mT, with m=0, 1, 2, ..., has a specific value equal to one of the values $nh\pi$, with n=0, $\pm 1$, $\pm 2$, ... etc. The fact that the phase substantially has fixed values at the aforementioned instants is caused by the area under the impulse response curve g(t) and hence the modulation index having the value equal to h due to the dimensioning of the premodulation filter, so that the phase per time T can exactly change by the values of $h\pi$. In most types of CPM modulation the phases at the instants mT have the constant unique values of $(0\pm 2\pi n)$ only after multiplication of the modulated carrier signal by the factor 2/h in the multiplier 3. An example of an exception to this is formed by TFM, wherein a substantially constant unique value $((\pm 2n+1)\pi)$ occurs not only with a factor eight but also with a factor four, as will be explained hereinafter.

Figure 3A:
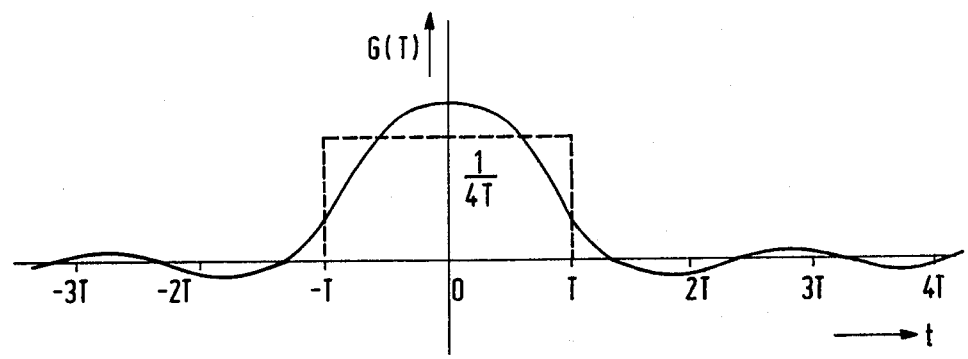
FIG. 3a: shows the impulse response
Figure 3B:
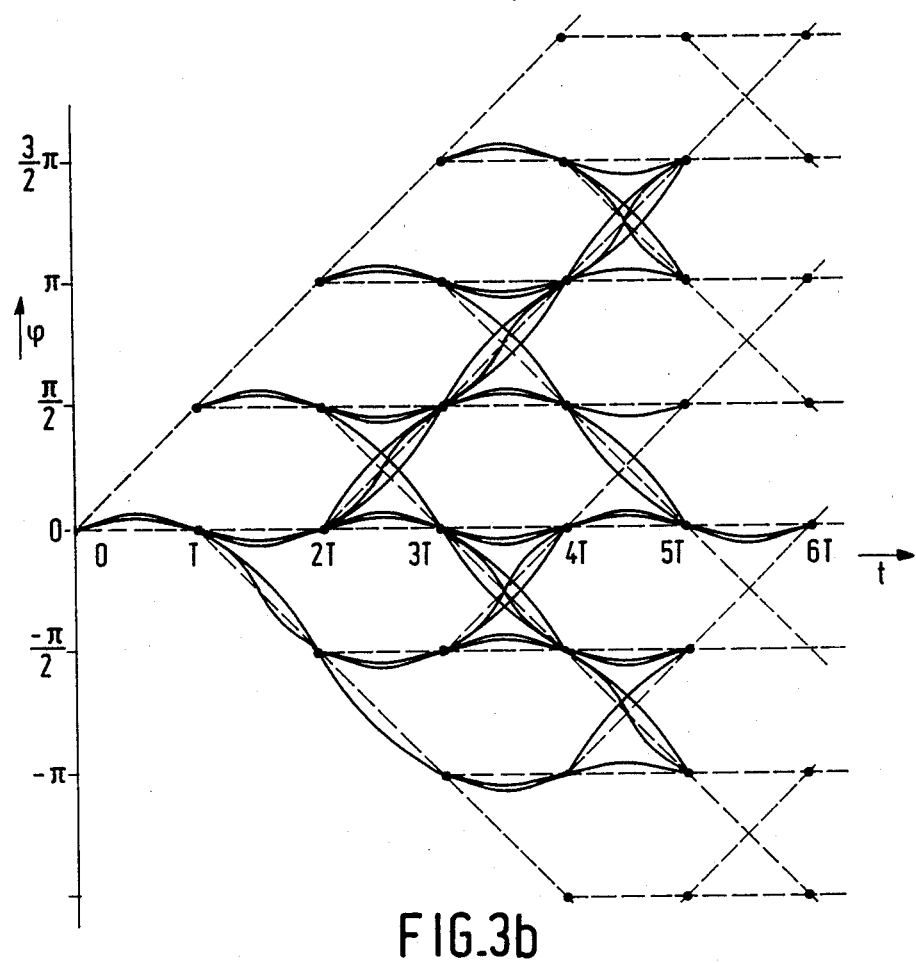
FIG. 3b: shows the waveform for CORPSK (2-3, 1+D) and duebinary CPM with $\underline{h}=0.5$

FIG. 3a shows the impulse responses g(t) and FIG. 3b shows the relevant waveform for CORPSK (2-3, 1+D) in solid lines and for duobinary CPM in dashed lines. In the indication (2-3, 1+D) the numeral 2 points out that the information signal applied to the premodulation filter is binary, the numeral 3 that the output signal of the premodulation filter is trinary for modulating the carrier signal with three different phase values, and 1+D that the successive information bits are correlated because in the premodulation filter the instantaneous standardized information bit, indicated by 1, has to be added to the preceding information bit delayed over a period time T indicated by the D of Delay.

In FIG. 3a the area underneath the impulse response curve g(t) has the value of $\frac{1}{2}$ so that all branches of the waveform pass through the fixed phase points $n\pi/2$ at the instants nT. Multiplication in multiplier 3 (FIG. 1) by 2/h=4 brings the phase at the aforementioned instants back to $0\pm 2\pi n$ in the desired harmonic.

Figure 4A:
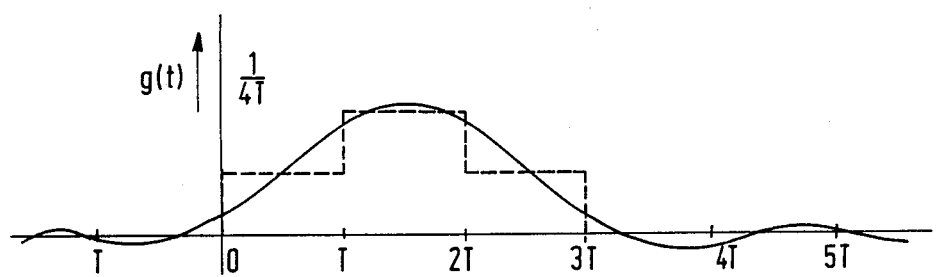
FIG. 4a: shows the impulse response
Figure 4B:
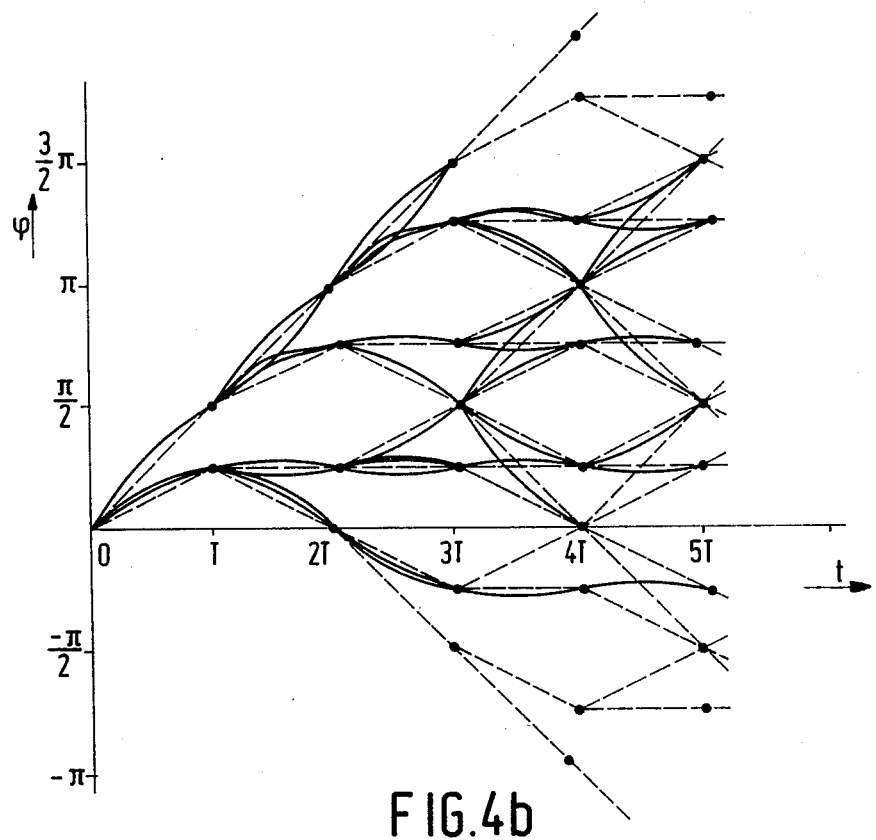
FIG. 4b: shows the waveform for TFM and TFSK, respectively.

As a last example FIG. 4a shows the impulse response g(t) and FIG. 4b shows the associated waveform for TFM in solid lines while for TFSK (Tamed Frequency Shift Keying) the dashed lines are used. Here too the phase of the carrier signal turns out to have exact values at the end of the symbol intervals, in this case equal to n $\pi/4$. Consequently, a multiplication by a factor 8 is required in the multiplier (FIG. 1). However, FIG. 4b shows that in the center of the symbol intervals the phases always turn out to be close to the values of $\pi/4+n\pi/2$, where n is an integer. Multiplying this signal by a factor 4 in the multiplier 3 will now suffice for achieving the substantially fixed values $\pi+2\pi n$ at the aforementioned sampling points $(\frac{1}{2}+m)T$ in the desired harmonic signal.

Despite the fact that the phases at the aforementioned sampling points do not exactly have the values of $\pi/4+n\pi/2$, with respect to the fixed phase points at the sampling points mT, this is advantageous in that a reliable carrier reproduction is feasible by a mere multiplication by a factor 4.

For CPM-signals having a rational modulation index it may be concluded from the aforeshown examples that by a multiplication by an integer the phases of the carrier signal are incremented such that at certain sampling points a single virtually fixed phase value occurs in the desired harmonic signal, for example $0\pm2\pi n$ or $\pi\pm2\pi n$, that is to say a carrier phase irrespective of the symbol pattern of a data series.

Extracting the carrier signal by supplying the output signal of the multiplier 3 directly to the narrow-band first bandpass filter 4 in the conventional way, has a sub-optimal result due to the not insignificant jitter in the reproduced carrier signal. This jitter effect occurs as many elements causing disturbance occur in the signal after the multiplier 3 in addition to the desired phase values at the aforesaid sampling points.

To reduce this jitter effect the carrier reproducing circuit 10 comprises a sampling means 7 inserted between the multiplier 3 and the first bandpass filter 4, which sampling means is controlled by a clock signal coming from a clock signal regenerator 8. This clock signal regenerator 8 is connected to the wide band filter 2 for regenerating an accurate clock signal in the known manner from the signal produced by the wide band filter 2. Such a clock signal regenerator is, for example, described in the aforementioned article entitled "Synchronization properties of continuous phase modulation" by T. Aulin and C. E. Sundberg, published in the Conference Papers of Globecom 82, Global Telecommunications Conference, Miami, Nov. 29–Dec. 2, 1982.

The clock signal regenerator 8 further comprises a delay means 8a, (for example a delay line) having such a delay that the delayed clock pulses occur at the sampling point desired for a specific CPM signal in each symbol interval. If the receiver has to be suitable for receiving several types of CPM signals, a single adjustable delay means can be used to advantage rather than several switchable delay means.

As the phase of the modulated carrier signal has the desired value only at one or in some cases at two points per symbol interval, it is essential that the multiplier 3 output signal be sampled only at these points. This implies that sampling by means of a sampling pulse wider than an instantaneous sampling pulse will have a detrimental effect on the accuracy of the reproduced carrier signal.

A further improvement is obtained by inserting a relatively wide second bandpass filter 9, preferably having a bandwidth in the order of $f_{IN}$, between the multiplier 3 and the sampling means 7, to isolate the spectrum of the desired harmonic.

The improvement of a single C.P.M. signal having a rational modulation index, more specifically a TFM-signal, achieved by sampling will now further be explained with reference to a table showing computer simulations.

In the first column of the table is shown the S/N-ratio of the TFM-signal applied to the reproducing circuit of FIG. 1.

The three remaining columns of the table show the square root of the mean square value of the phase error $\Delta\phi$ of the reproduced carrier signal over the last 136 data symbols of 156 received data symbols as well as the acquisition time $T_{acq}$ of the receiver, expressed in symbol times T, assuming acquisition if the phase error is smaller than 5°. More specifically, the first column of these three shows the aforementioned values for a multiplication factor N=4, without sampling the second column shows the values for a multiplication factor N=4 with instantaneous sampling in the center of the symbol intervals and the third column shows the values for a multiplication factor N=8 with instantaneous sampling at the end of the symbol intervals.

TABLE

| | TFM signal | | |
|---|---|---|---|
| | $\Delta\phi_{rms}$ (deg)/$T_{acq}$ (symbols) | | |
| S/N (dB) | without sampling N = 4 | with sampling N = 4 | with sampling N = 8 |
| 40 | 0.5/7 | 0.5/3 | 0.1/5 |
| 16 | 1.6/2 | 1.0/6 | 0.6/2 |
| 13 | 2.4/3 | 1.4/5 | 1.1/2 |
| 10 | 3.6/10 | 1.9/7 | 6.3/7 |
| 7 | 4.9/12 | 3.3/— | — |

From this table it can be concluded that with instantaneous sampling in the center of the bit interval (N=4) a considerable improvement in suppressing phase jitter is achieved for TFM-signals compared with the cases where no sampling is used. More specifically so with S/N ratios which are most important in practice. At a S/N-rato of 10 dB, for example, the improved phase jitter suppression is even 6 dB. With instantaneous sampling at the end (N=8) of the symbol intervals, where the phase is exactly equal to a multiple of $\pi/4$, the jitter suppresson is far better than with instantaneous sampling in the center (N=4) of the symbol intervals, more specifically, up to a S/N ratio better than approximately 12 dB. However, at a S/N ratio of 10 dB the high multiplication factor starts taking its toll and the phase jitter in the reproduced carrier signal will rise rapidly.

Indeed, for practical values of the S/N ratio the multiplication factor 4 with center-sampling is to be preferred. The above-mentioned example will have shown that improvements similar to those shown for TFM signals will likewise occur for other CPM-signals having a rational modulation index.

What is claimed is:

1. A receiver for a pulse-coded continuous phase-modulated carrier signal having a rational modulation index, comprising
a coherent detector, and
a circuit for providing an extracted carrier signal to said detector, said circuit comprising:
a clock pulse regenerator; a multiplier, receiving said phase-modulated carrier signal, for generating an $N^{th}$ harmonic of said phase-modulated carrier signal, and producing a multiplier output comprising said $N^{th}$ harmonic, where N is an integer greater than 1; a first bandpass filter coupled to the multiplier and receiving said output for isolating said $N^{th}$ harmonic, and having a first filter output which is the isolated $N^{th}$ harmonic; and a divider connected to the first bandpass filter for receiving the isolated $N^{th}$ harmonic, having a dividend N and a divider output which is said extracted carrier signal,
characterized by comprising a sampling circuit inserted between the multiplier and the first bandpass filter, connected to the clock pulse regenerator for instantaneous sampling of the $N^{th}$ harmonic under the control of a clock pulse signal originating from the clock pulse regenerator at no less than one predetermined sampling point per symbol time T of the data signal, and for conveying these instantaneously sampled signal values to the first bandpass filter only.

2. A receiver as claimed in claim 1, characterized by comprising a second bandpass filter inserted between the multiplier and the sampling arrangement, said second bandpass filter having a bandwidth exceeding by far the bandwidth of the first bandpass filter.

3. A receiver as claimed in claim 1, characterized in that the clock pulse regenerator comprises an adjustable delay means for being capable of reproducing a carrier wave for any type of continuous phase-modulated carrier signal having a rational modulation index.

4. A receiver as claimed in claim 3, comprising a third wideband pass filter receiving said phase-modulated carrier signal and having an output, said output being connected to an input to said multiplier and said clock pulse regenerator.

5. A receiver as claimed in claim 2, comprising a third wideband pass filter receiving said phase-modulated carrier signal and having an output, said output being connected to an input to said multiplier and said clock pulse regenerator.

6. A carrier reproducing circuit for extracting the carrier signal from a pulse-coded continuous phase-modulated carrier signal having a rational modulation index, comprising a clock pulse regenerator; a multiplier, receiving said phase-modulated carrier signal, having a multiplication factor $N(N=2, 3, \ldots)$ for generating an $N^{th}$ harmonic of said phase-modulated carrier signal, and producing a multiplier output comprising said $N^{th}$ harmonic, where N is an integer greater than 1; a first bandpass filter coupled to the multiplier and receiving said output for isolating said $N^{th}$ harmonic, and having a first filter output which is the isolated $N^{th}$ harmonic; and a divider connected to the first bandpass filter for receiving the isolated $N^{th}$ harmonic, having a dividend N and a divider output which is said extracted carrier signal, characterized by comprising a sampling circuit inserted between the multiplier and the first bandpass filter, connected to the clock pulse regenerator for instantaneous sampling of the $N^{th}$ harmonic under the control of a clock pulse signal originating from the clock pulse regenerator at no less than one predetermined sampling point per symbol time T of the data signal, and for conveying these instantaneously sampled signal values to the first bandpass filter only.

7. A circuit as claimed in claim 6, characterized by comprising a second bandpass filter inserted between the multiplier and the sampling arrangement, said second bandpass filter having a bandwidth exceeding by far the bandwidth of the first bandpass filter.

8. A circuit as claimed in claim 6, characterized in that the clock pulse regenerator comprises an adjustable delay means for being capable of reproducing a carrier wave for any type of continuous phase-modulated carrier signal having a rational modulation index.

* * * * *